United States Patent [19]

Atkinson

[11] E Patent Number: Re. 32,663

[45] Reissued Date of Patent: May 3, 1988

[54] ARTICULATED EROSION CONTROL SYSTEM

[76] Inventor: Francis S. Atkinson, 4930 Imogene, Houston, Tex. 77096

[21] Appl. No.: 699,698

[22] Filed: Feb. 8, 1985

Related U.S. Patent Documents

Reissue of:

[64] Patent No.: 4,372,705
Issued: Feb. 8, 1983
Appl. No.: 207,879
Filed: Nov. 18, 1980

[51] Int. Cl.[4] ..... E02B 3/12

[52] U.S. Cl. ..... 405/19; 446/124; 52/590; 404/40; 405/16

[58] Field of Search ..... 405/15–19, 405/28–34; 404/38–43

[56] References Cited

U.S. PATENT DOCUMENTS

| | | | |
|---|---|---|---|
| 3,168 | 7/1843 | Terry | 404/41 |
| 708,470 | 9/1902 | Flood | 404/42 |
| 930,153 | 8/1909 | Butz | 404/40 |
| 1,164,707 | 12/1915 | Edinger | 405/20 |
| 1,436,896 | 11/1922 | Newell | 404/40 |
| 3,093,568 | 6/1963 | Cox | 46/26 X |
| 3,096,695 | 7/1963 | Reinhardt | 404/43 |
| 3,310,906 | 3/1967 | Glukes | 46/25 |
| 3,420,275 | 1/1969 | Glen et al. | 46/26 X |

FOREIGN PATENT DOCUMENTS

| | | | |
|---|---|---|---|
| 497010 | 11/1950 | Belgium | 404/41 |
| 1534368 | 5/1969 | Fed. Rep. of Germany . | |
| 2123523 | 11/1972 | Fed. Rep. of Germany | 405/20 |
| 2141107 | 3/1973 | Fed. Rep. of Germany | 405/16 |
| 2161720 | 6/1973 | Fed. Rep. of Germany | 46/31 |
| 566937 | 11/1923 | France | 404/41 |
| 958086 | 9/1949 | France | 405/16 |
| 1265140 | 5/1961 | France | 405/16 |
| 7438621 | 6/1975 | France . | |
| 7532233 | 5/1977 | France . | |
| 546700 | 4/1976 | Netherlands . | |
| 427207 | 6/1967 | Switzerland | 46/26 |
| 247616 | 2/1926 | United Kingdom | 404/41 |
| 267832 | 3/1927 | United Kingdom | 404/41 |
| 2025494 | 1/1980 | United Kingdom . | |

*Primary Examiner*—Dennis L. Taylor
*Attorney, Agent, or Firm*—Pravel, Gambrell, Hewitt, Kimball and Krieger

[57] ABSTRACT

An articulated erosion control system provides a flexing articulated mat comprising a plurality of blocks which interlock in a three dimensional fashion allowing a mat formed of the blocks to conform to changes in terrain. In the preferred embodiment there is provided at least one "lock block" (FIG. 1) having a plurality of open ended sockets spaced about the periphery thereof and at least one "key block" (FIG. 2) being connectable during operation to the lock block; the key block providing a plurality of locking arms spaced about and integrally formed with a central portion of the key block. Connection of the lock block and the key block can be achieved by relative vertical movement of the key block towards the lock block when the key block locking arm is superimposed over the open ended socket of the lock block—the connection being completed when a portion of the locking arm occupies at least in part the space within the socket. The socket is narrowed at its intersection with the peripheral wall portion of the lock block. The tip portion of the key block locking arm is enlarged thus disallowing relative motion between the key block and the lock block in a generally horizontal direction once the locking integral arm and socket are connected. In the preferred embodiment, the key block and lock block are each integrally formed—being, for example, of concrete or the like material. The blocks may have wave energy absorbing elements projecting from their upper surfaces.

22 Claims, 8 Drawing Sheets

ARTICULATED EROSION CONTROL SYSTEM

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates to the control of soil erosion especially on the sides of rivers, drainage canals and riverbeds, on levees, beaches and the like. The present invention more particularly relates to an articulated erosion control system comprising a plurality of blocks, each of which is connected to the adjacent block by an interlocking connection provided by the blocks themselves which interlocking connection maintains horizontal block placement yet allows articulated movement in all directions of the blocks with respect to one another allowing conformation of the overall block system to the underlying terrain.

2. General Background

Erosion of land is a problem generally accompanied by water flow at the interface of the land and the water such as on the side of a riverbed or on a beach. Erosion can also occur as a result of rainfall as it proceeds through a particular basin to the river which empties that area.

Erosion is prevented in a natural sense by the growth of trees, grass, vegetation and the like with their root systems functioning to consolidate the underlying soil and prevent the mechanical erosion by both water and wind, but mainly water.

The natural vegetation is removed purposefully in many instances as when streams are channelized, or cleaned, or when levees are reformed. Other times vegetation removal and resulting erosion is natural, caused by flooding or the mechanical action of streams, rivers and generally by natural water flow.

Land which has been stripped of the natural vegetation is highly susceptible to erosion by wind and rain since the consolidation provided by vegetation is missing. This occurs on sloped terrain, as well as on terrain which is flattened.

The erosion problem is compounded by the removal of forrests, overgrazing of land, burning, construction of highways and the like, and the channelization of streams.

Planting rapidly growing vegetation on areas which have been stripped is sometimes successful but usually only where the vegetation grows rapidly and extensively enough so that the soil is protected. In areas where water is continually flowing such as on riverbanks, the growth of vegetation can usually not be done quickly enough to prevent erosion. Various systems of revetment have been used to augment or replace vegetation as an erosion barrier. The art has used loose fill barriers (riprap), continuous paving mats (some with weep holes to relieve pore pressure) and porous paving mats to control erosion.

"Riprap" which is known for control of erosion is basically a barrier or coverage comprising a plurality of large chunks of concrete (obtained, for example, in salvage operations) which are dumped in a particular area. The concrete chunks are usually of random size, with some so large as to not provide protection and washouts occur underneath. Further, the placement is often random, not adequately covering the subject area.

Solid continuous paving mats of concrete are highly costly because of the extensive amount of concrete required, the difficulty and costs of installation, and the problems of hydrostatic pore pressure which are created once the concrete is in place.

Paving blocks of concrete and other materials are known. Flexible porous concrete mats have been used as an erosion controlling protective surface.

Different patents directed to using revetment blocks and structures for preventing soil erosion have been issued. U.S. Pat. Nos. 242,689; 306,251; 314,022; 541,815; 572,762; 984,121; 994,999; 1,039,579; 1,162,499; 1,379,440; 1,597,114; 1,636,114; 1,691,848; 1,772,821; 1,822,602; 1,834,060; 1,847,852; 1,927,834; 1,939,417; 1,991,196; 1,993,217; 2,008,866; 2,047,197; 2,143,461; 2,159,685; 2,221,416; 2,295,422; 2,454,292; 2,577,170; 2,662,343; 2,674,856; 2,876,628; 3,096,621; 3,176,468; 3,210,944; 3,301,148; 3,343,468; 3,344,609; 3,386,252; 3,421,417; 3,597,928; and 4,227,829 disclose blocks and erosion control systems. These disclosures of the above U.S. patents are incorporated by reference herein.

U.S. Pat. No. 4,227,820 discloses a device comprising a matrix of cellular concrete blocks, each of which has internal passageways for cables to pass therethrough and interconnect a matrix of concrete blocks. The free ends of the cables are anchored into the ground after which operation the soil is spread over the blocks to reinforce surface thus controlling soil erosion.

U.S. Pat. No. 4,152,875 discloses a ground covering with adjoining plates which are clamped together by tensioning elements extending through the plates and parallel to them.

Nijdorn in U.S. Pat. No. 3,922,865 describes a mattress having a filter cloth with metal bars woven thereinto. Spaced concrete blocks are connected to these bars.

Appelton in U.S. Pat. No. 3,903,702 teaches the use of a revetment structure with similar interfitting units which form a flexible mattress. The units are provided with a series of interconnected ribs which make opposite sides of the units reflections of each other.

U.S. Pat. No. 3,597,928 discloses the use of porous flexible supporting sheets with mat of blocks which are placed on these sheets. Each mat consists of a plurality of blocks with drainage passageways therethrough and the blocks are secured to the sheets by adhesive means.

Nelson in U.S. Pat. No. 3,386,252 discloses a riprap structure for waterways, comprising rectangular blocks interconnected by a rod which extends through the blocks to provide for hooking the blocks at diagonally opposite corner ends and forming a matrix.

Dixon, U.S. Pat. No. 2,876,628 discloses a rapidly sinking articulated revetment for riverbanks comprising rigid blocks interconnected by flexible cables. The upper surface of each block has recesses from which openings extend through the whole block to provide for water passageways.

Louckes in U.S. Pat. No. 2,674,856 teaches the use of a similar flexible revetment mat which flexibility comes from the use of reinforced wires extending continuously from one concrete block to another to form a mattress for protection of river banks from erosion.

U.S. Pat. No. 2,159,685 describes a concrete riprap consisting of precast units connected by interlocking bars which pass through the orifices in the body of each unit.

A revetment in U.S. Pat. No. 2,008,866 comprises a number of rectangular concrete blocks arranged diagonally and hooked together by crossed rods to form a mat.

Mason in U.S. Pat. No. 1,987,150 teaches the use of a revetment containing filled asphalt in a certain proportion. A mat of such asphalt is placed adjacent a mattress consisting of slabs interlocked by cables or clips passed through the rings at each corner of a slab.

U.S. Pat. No. 1,359,475 describes a seawall construction comprising concrete panels with mating tongues and grooves at their edges and locked together by metal rods passing through the notches in the tongues and grooves.

Edinger in U.S. Pat. No. 1,164,708 discloses an embankment protection construction composed of interlocking rectangular concrete slabs with integrally made hook flanges and interengaging keys and sockets for locking the slabs in a mattress.

Edinger's U.S. Pat. No. 1,164,707 discloses a flexible concrete slab revetment construction composed of concrete slabs with integrally formed concrete joints interlocking the slabs, these slabs being preferably of a triangular contour.

U.S. Pat. No. 763,171 teaches the use of enbankment linings consisting of brick or stone blocks interlocked by wires passing through the perforations in the block bodies.

Villa in U.S. Pat. No. 554,354 discloses a covering for protecting banks from erosion, this covering comprising cement or terra-cotta prismatie plates interconnected by wires which pass through the plates to form rows of units adapted to cover riverbeds and banks, and free ends of wires are fastened to trees or piles driven into the bank.

Flexible mats, though generally more expensive than riprap or continuous paving barriers, are usually more stable. Flexible mats are not as prone to under-cutting erosion, by water, and provide greater relief for hydrostatic pressure. Flexible mats do exhibit failure, however, when individual elements of the mat are displaced by hydrostatic pressure or wave action, for example.

Applicant has provided an improved flexible mat structure which relieves hydrostatic pressure, conforms to the underlying surface, and retains its structural integrity. The noted advantages may be achieved at a cost which is competitive to known structures.

GENERAL DISCUSSION OF THE PRESENT INVENTION

The present invention provides a lock block and key block system which allows articulated connections to be formed between the lock block and the key block so that a mat of the key blocks and lock blocks can be formed in the field by the interlocking of the blocks themselves without extraneous connectors, wires, cables, and the like. A mat formed with the preferred embodiment of the apparatus of the present invention retains its interlocking integrity even after temporary connections which might be used in placement of a mat assembly have been eroded or corroded away. The preferred embodiment provides at least a lock block having sockets spaced around about the periphery thereof which can be connected in two radial directions to an adjacent pair of blocks. The connection between blocks is provided by a socket on one block and an enlarged head on the adjoining block which occupies the socket and allows the two blocks to articulate with respect to one another in a pivotal fashion. The sockets and locking heads provide narrowed portions which discourage disassembly by horizontal movement once the blocks are in the position. Sidewalls of the sockets and locking heads can be bevelled to allow for the surfaces of adjoining blocks to form angles with respect to one another as when the blocks occupy a curved contour, dome, valley, or like irregularity in terrain.

In the preferred embodiment, the lock block is hexagonal having rounded sockets outcropping on three of the peripheral sides. The remaining two sides can have immediately inside their surface vertical openings or passageways which might allow for hydraulic flow, the passage of vegetation, and the accumulation of soil and silt. The key block in the preferred embodiment is a three-armed key block having a central hub with three locking arms projecting radially (preferably equi-radially-spaced) with enlarged locking heads being provided at the tip of each arm. The center of each locking head and the center of each locking arm form respectively equilateral triangles of identical dimension on each key block and on each lock block.

In the preferred embodiment, the equilateral triangular geometric placement of the key block socket centers and the lock block locking head centers insures interlocking points of articulation between adjacent blocks. Flexibility in each direction is provided and in an alternative embodiment a twist-in lock assembly is provided which allows easy assembly of adjacent blocks yet discourages substantial vertical relative movement therebetween thereafter which might result in disassembly.

The present invention provides an articulated erosion control system having at least one lock block and a pair of key blocks. The key blocks are connectable to the lock block independently in an interlocking fashion with each of the lock blocks, with the key block-lock block connections being in separate directions and in an articulated fashion. This allows multi-directional flexibility which allows an entire mat system formed of the blocks to conform easily to changes in terrain both with regard to curvature and irregular size.

Thus, it is an object of the present invention to provide a three dimensional interlocking mat assembly for erosion control.

Still another object of the present invention is to provide an articulated erosion control system having flexibility in every direction.

Another object of the present invention is to provide an interlocking mat for use in erosion control system with the interlocking connections being spaced in an equilateral triangular fashion.

Still another object of the present invention is to provide a twist-in lock for attaching adjacent blocks which allows easy assembly but discourages disassembly due to relative vertical movement of adjacent blocks.

A further object of the present invention is to provide an articulated erosion control mat system which can be easily adapted to disposable sling type lifting and placement.

Another object of the present invention is to provide an alternative wire interconnecting system for assembling a plurality of adjacent blocks forming an overall articulated erosion control system.

Still another object of the present invention is to provide an articulated erosion control system useful in the controlling of waves at seashores, surfs, and the like.

It is another object of the present invention to provide an articulated erosion control system having a plurality of blocks which can be interconnected on sight without the use of further connection devices than the blocks themselves.

Still another object of the present invention is to provide an overall articulated erosion control system which easily conforms to changes in terrain relief and shape.

Still another object of the present invention is to provide an articulated erosion control system which allows vegetation to grow through the system.

Another object of the present invention is to provide an articulated erosion control system which can use but does not rely upon a mat or other interconnection between adjacent blocks for its long term performance.

BRIEF DESCRIPTION OF THE DRAWINGS

For a further understanding of the nature and objects of the present invention, reference should be had to the following detailed description, taken in conjunction with the accompanying drawings, in which like parts are given like reference numerals and wherein.

DETAILED DESCRIPTION OF THE PREFERRED EMBODIMENT

Figure 1:
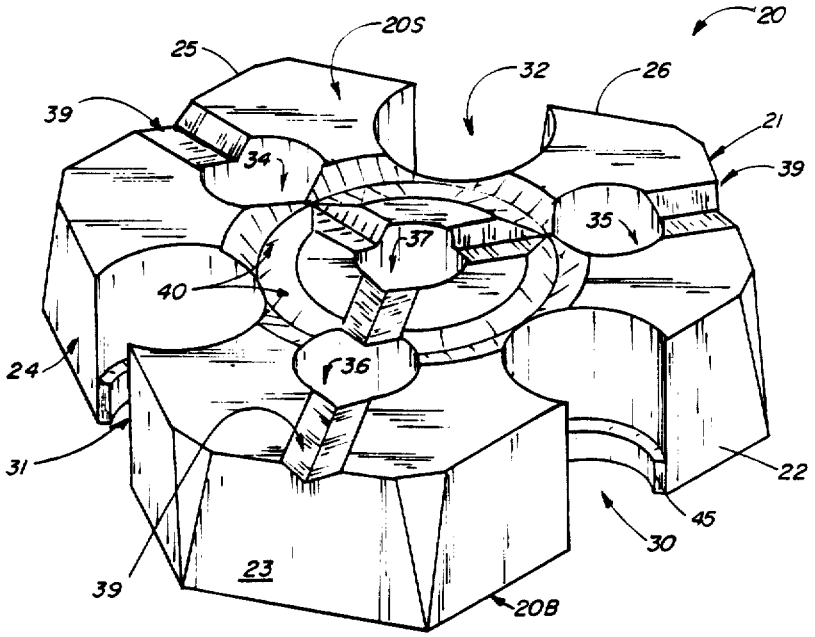
FIG. 1 is a perspective view of the lock block portion of the preferred embodiment of the apparatus of the present invention.
Figure 2:
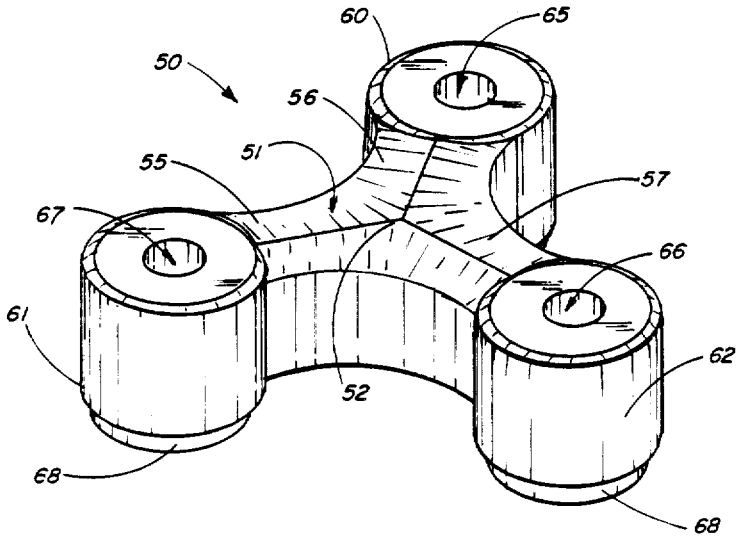
FIG. 2 is a perspective view of the key block portion of the preferred embodiment of the apparatus of the present invention.

In FIGS. 1 and 2 there is seen respectively the lock block 20 portion of the preferred embodiment of the apparatus of the present invention (FIG. 1) and the key block 50 portion of the preferred embodiment of the apparatus of the present invention (FIG. 2).

As will be described more fully hereinafter, each block 20, 50 can be integral and blocks 20, 50 attach together by interlocking. The blocks 20, 50 so provided interlock to form an enlarged articulated mat 10 which can be seen in FIGS. 7–8, which mat allows articulation of the individual blocks and some relative vertical movement, yet maintains horizontal spacing thus allowing the mat 10 to conform to the underlying terrain.

Figure 9:
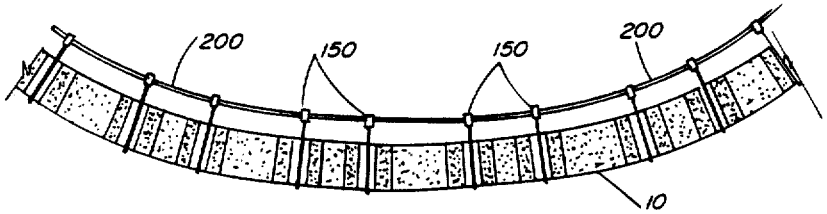
FIG. 9 is a section view of the preferred embodiment of the apparatus of the present invention during lifting.
Figure 10:
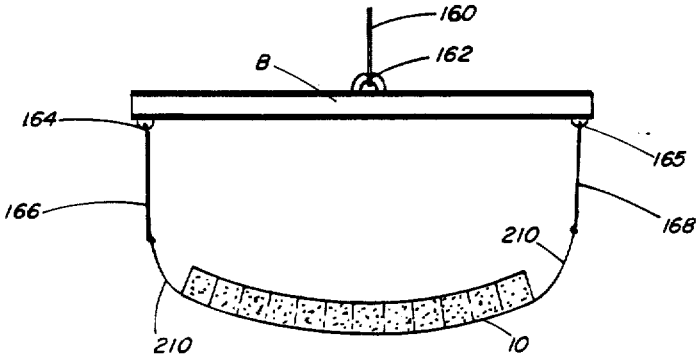
FIG. 10 is a schematic view illustrating lifting of the preferred embodiment of the apparatus of the present invention using a flexible mat to lift.

The assembled articulated erosion control system 10 can be lifted (as during installation) by a spreader bar or crane and assumes a curved position characteristic of a flexible sheet supported at its ends (see FIGS. 9 and 10).

FIGS. 1 and 2 show more particularly the construction of lock block 20 and key block 50.

In FIG. 1 can be seen lock block 20 which provides upper and lower coplanar and preferably parallel surfaces which terminate at a peripheral terminal sidewall. A hexagonal shape is preferable with hexagon sidewalls 21–26 being shown in FIG. 1.

Figure 7:
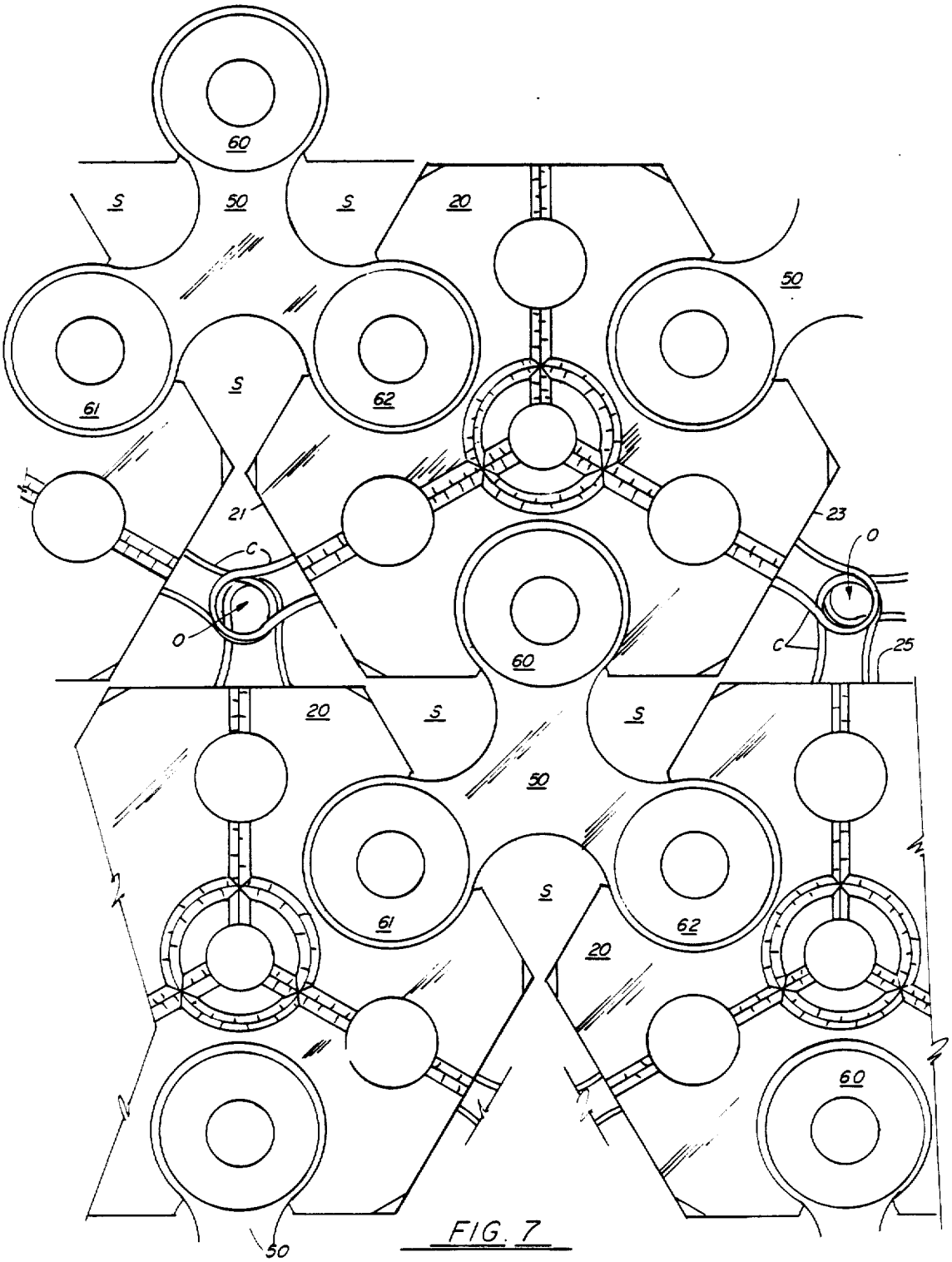
FIG. 7 is a top view of the articulated erosion control mat system of the present invention illustrating a plurality of key blocks and lock blocks interconnected.

Three alternate sidewalls 22, 24, and 26 provide sockets 30–32 which are open recesses at surface 20S of block 20 as well as being open recesses at sidewalls 22, 24, and 26 and at the bottom 20B of block 20. As will be described more fully hereinafter, each socket 30, 31, and 32 provides a place for the interlocking connection of key block 50 thereto with three key blocks being attachable respectively at sockets 30–32 of each lock block 20 to form the articulated erosion control system 10 as shown in FIGS. 7 and 8.

The upper surface 20S of block 20 provides an etching of radial V-shaped channels 39 and circular V-shaped channels 40 which provide recesses that will during operation gether soil allowing natural vegetation to grow on the surface of block 20 further enhancing erosion control and aesthetics.

A plurality of vertical preferably cylindrical channels 34–37 are provided through block 20 which allow hydrostatic flow through block 20 as well as allowing the growth of vegetation therethrough which enhances the anchoring of block 20 to its final position.

FIG. 2 shows more particularly the construction of key block 50. Key block 50 comprises a central hub 52 from which extend radially a plurality of spaced locking arms 55–57 with three being shown in the embodiment of FIG. 2.

Each locking arm 55–57 has attached at its outermost tip portion to an enlarged locking head 60–62 respectively with each being slightly smaller than but correspondingly sized to register and fit within one of sockets 30–32 provided on lock block 20. Vertical channels 65–67 are provided respectively through heads 60–62 to allow fluid flow therethrough for hydraulic relief. Also vegetation can grow through channels 65–67 to aid in securement of block 50 to its underlying terrain. Each socket 30–32 may provide at its lowermost portion an annular rib 45 with a corresponding annular recess 68 being provided around the bottom of each locking head 60–62. This combination provides a stop which disallows a drop through of locking heads 60–62 through its respective socket. This connection is seen in FIG. 8 and once this assembly is completed the upper surface 20S of block 20 and the upper surface 51 of key block 50 would be substantially coplanar as shown in the drawings in FIG. 8.

An additional feature, not shown in the drawings, may be used to retain the assembled lock blocks 20 and key blocks 50 joined in the desired coplanar relationship. A flexible adhesive may be placed in the joint formed by locking heads 60–62 and sockets 30–32, for example, at the point of contact between annular ribs 45 and annular recesses 68. A continuous bead may be used or the application of adhesive could be discontinuous. Any suitable rubber-like or flexible adhesive could be used. A one-component polyurethane adhesive manufactured by Sika Corporation, Lyndhurst, N.J. under the trademark SIKAFLEX has been found to be satisfactory.

Figure 3B:
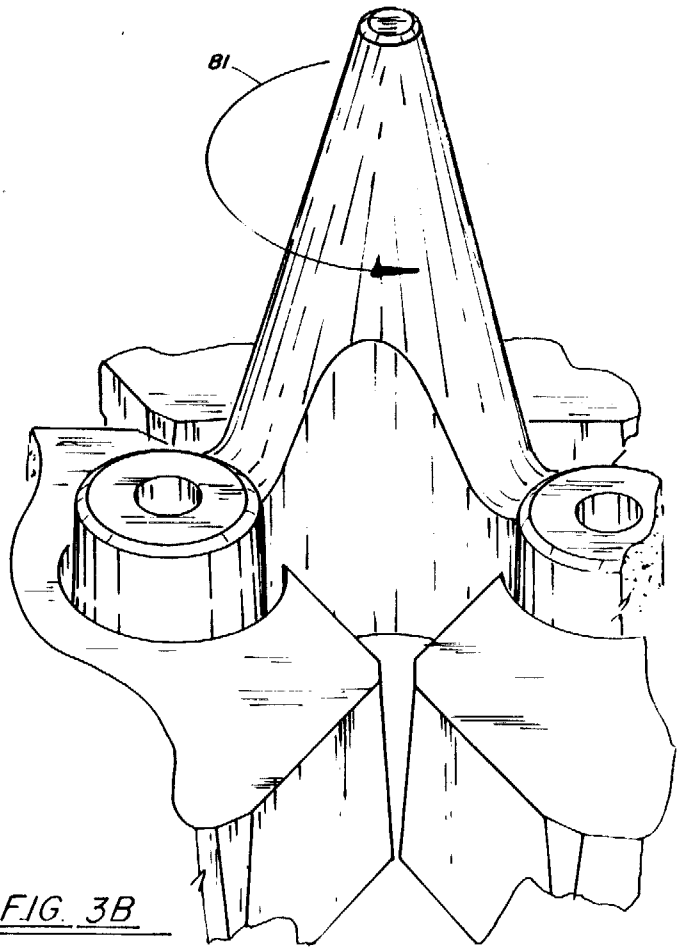
FIGS. 3A–3C are sequential views illustrating assembly of the key block and lock block portions of the preferred embodiment of the apparatus of the present invention and further illustrating the wave control embodiment of the key block portion.
Figure 3A:
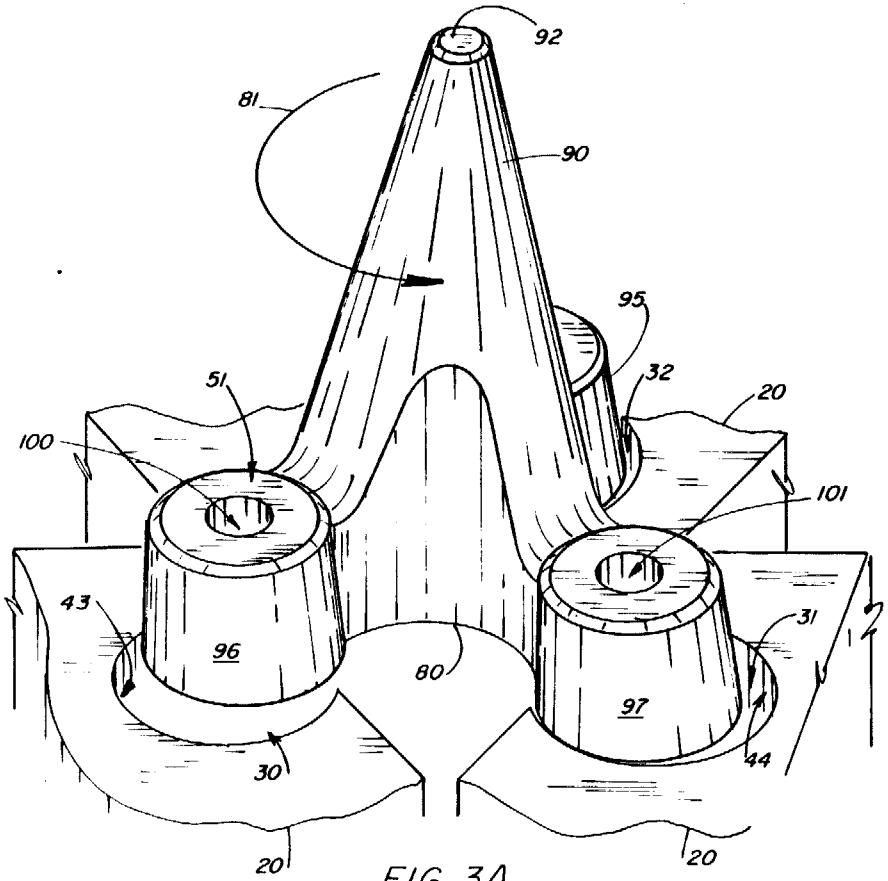
Figure 3C:
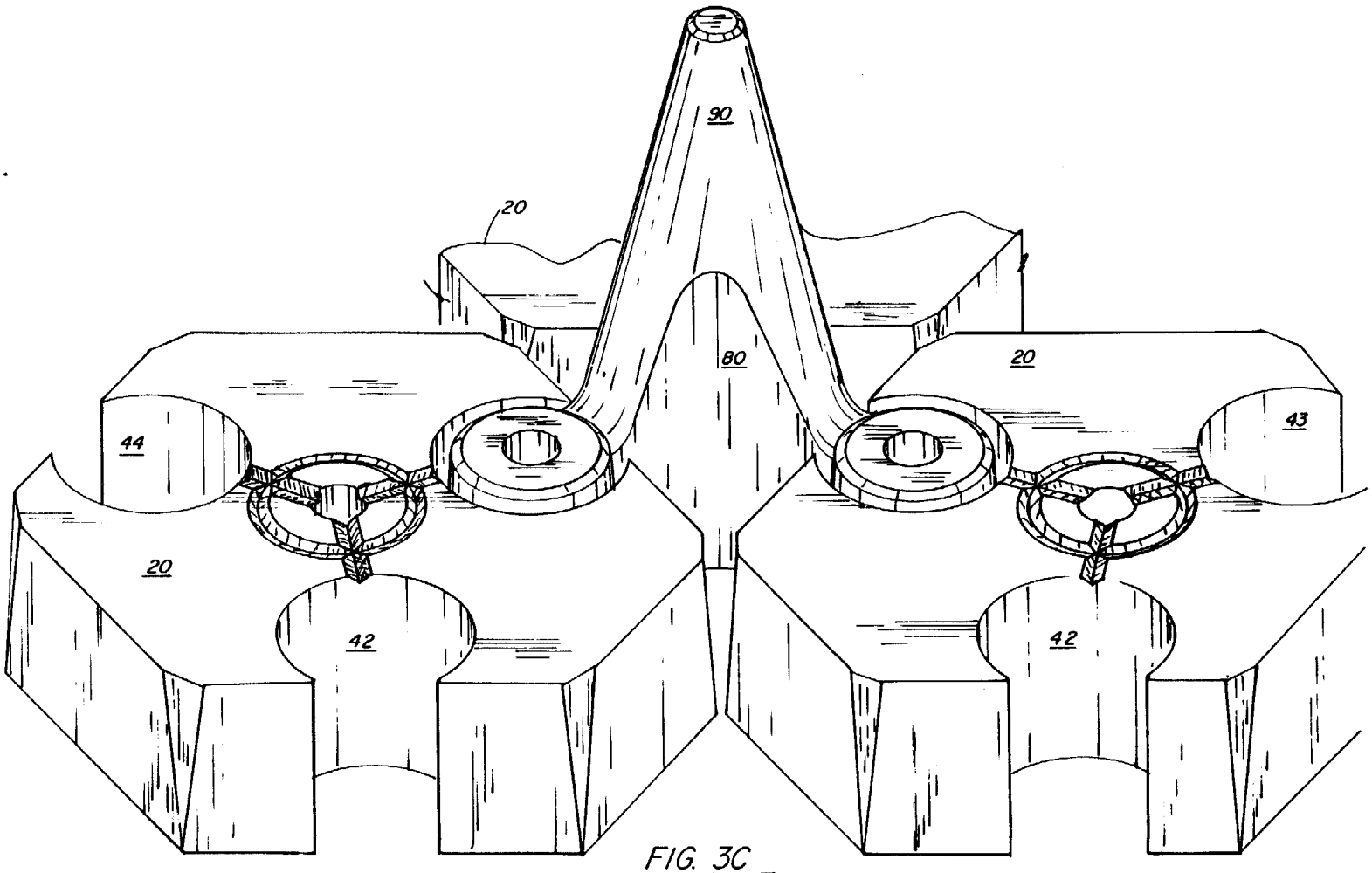

FIGS. 3A–3C show more particularly the assembly of a single key block being placed into three lock blocks 20.

In the embodiments of FIGS. 3A–3C and in those sequential views shown, note the key block being provided as designated by the numeral 80 with key block 50 having a wave control cone 90 portion which extends upwardly a distance of, for example, three times the overall height of the key block 80 itself. Wave control cone 90 can provide a truncated top 92 which gradually contours to meet locking heads 95–97 with each locking head being provided with a vertical channel 100–102. Though the wave control is shown, in FIGS. 3A–3C, as a truncated cone 90, it will be appreciated that another equivalent shape could also be used, such as a cone, a cylinder, a pyramid, a truncated pyramid or other polyhedron.

Figure 4A:
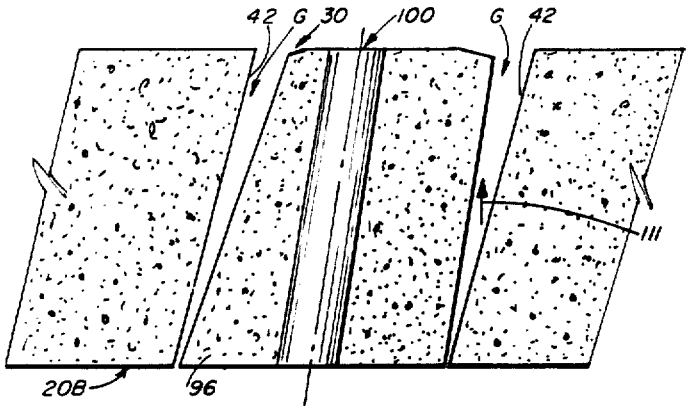
FIGS. 4A, 4B are sectional schematic views illustrating the bevelled sidewall portions of the key block and lock block.
Figure 4B:
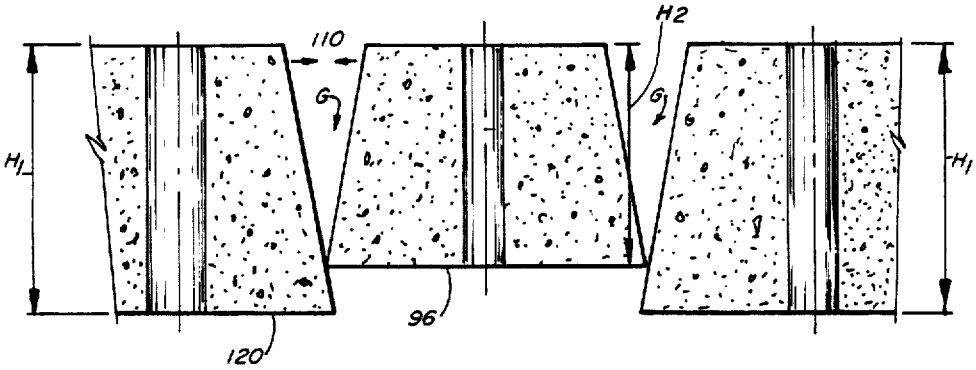

In the embodiment of FIGS. 3A–3C, the axis of each locking head 95–97 is skewed as shown in FIG. 4A. This requires that the assembly of key block 80 into lock blocks 20 be in downward and rotational (spiral) fashion which is shown by the curved arrow 81 in FIGS. 3A–3B. Sockets 30–32 of lock block 20 are similarly skewed with the inner curved sidewall 42–44 of each socket 30–32 being angularly disposed with respect to the bottom 20B of lock block 20. The connection between the lock blocks 20 and key block 80 is accomplished by joining a key block 80 simultaneously to three lock blocks 20. The three lock blocks 20 are placed in an array having the proper spacing and key block 80 is positioned over the array and joined thereto by a vertical helical motion, as shown in FIG. 3C. To assemble an entire mat 10, two rows of lock blocks 20 are laid out in an array similar to that shown in FIG. 7, a row of key blocks 80 is then assembled into the array by helical joining, as shown in FIG. 3C. An adjacent third row of lock blocks 20 is then laid and a second row of key blocks 80 is assembled into the lock blocks 20. Subsequent laying of additional rows of lock blocks 20 and key blocks 80 is repeated until construction of the mat 10 is complete. In FIG. 4A there can be seen a gap G which is provided due to the differing angular orientations of the inner curved wall 42 of socket 30 as compared with the angular orientation of the outer wall portion of enlarged locking head 96. This gap G allows for adjustment when an entire mat 10 of assembled lock blocks 20 and key blocks 50 are lifted as shown in FIGS. 9 and 10. Another embodiment of this adjustable feature when the mat 10 is lifted is seen in FIG. 4B where the locking head 96 of key block 50 would be of a shorter height H2 than the height H1 of the lock block 120 with the gaps G being also shown between and arrows 110 illustrating movement of the upper portion of adjacent lock blocks 20 toward the locking head 96 of key block 80. The presence of the gaps G allow flexible articulated movement of the mat 10 to conform to the shape of the substrate or support on which the mat 10 is placed. The mat 10 can often accommodate to hills, curves and depressions without the necessity of forming special arrays to fill or fit within spaces in the total array.

FIG. 3C illustrate a completed connection of key block 90 into three lock blocks 20. Once this combined downward and rotational connection (actually a spiral or helical movement) is completed, it will be apparent to one skilled in the art that vertical movement between key block 80 and lock block 20 will be difficult or at least discouraged. Arrow 111 in FIG. 4A illustrates the problems which locking head 96 would have in moving upwardly from socket 30. The rotational movement as illustrated would be easy to achieve manually upon assembly, but the same helical movement of locking heads 95–97 would not normally be duplicated by nature as by hydraulic action, waves or the like to a mat 10 once it is in place, In FIGS. 5 and 6 are illustrated top views of the wave control embodiment 125 of lock block 120 as well as the wave control cone embodiment 90 of key block 80.

Figure 5:
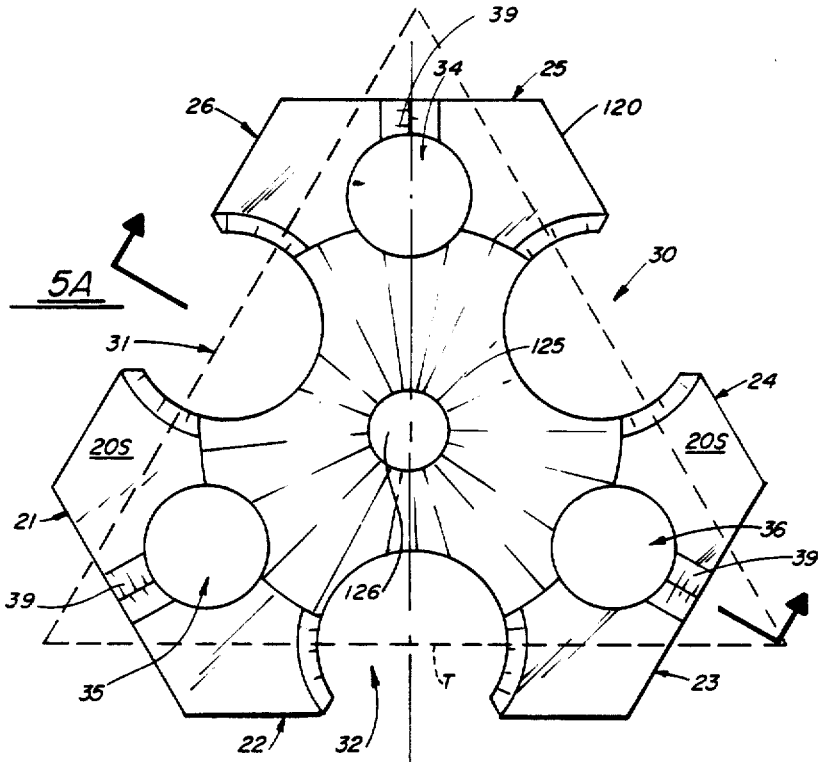
FIG. 5 is a top view of the wave control cone embodiment of the lock block portion of the preferred embodiment of the apparatus of the present invention.
Figure 6:
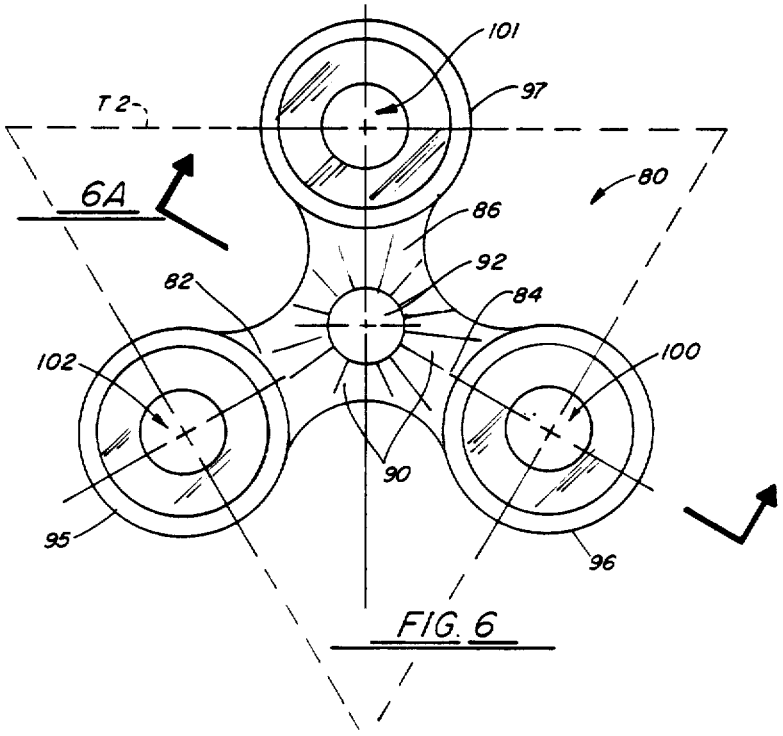
FIG. 6 is a top view of the wave control cone embodiment of the key block portion of the preferred embodiment of the apparatus of the present invention.

In the embodiment of FIGS. 5–6, each recess 30–32 is generally circular providing a center with an equilateral triangle "T" being formed by passing a line through the center of each recess and parallel to the adjacent face 22, 24, 26. The articulated connections between adjacent blocks 20, 50 or 20, 80 or 120, 80 would also fall on these sides of equilateral triangles. In FIG. 6, T-2 designates an equilateral triangle formed by intersecting each locking head 95–97 at its center with a line perpendicular to the radial center line of each locking arm 82–86. These triangles T and T-2 will have common sides when the lock block and key block are assembled with the interlocking connections of an entire mat forming an array of equilateral triangles.

Figure 5A:
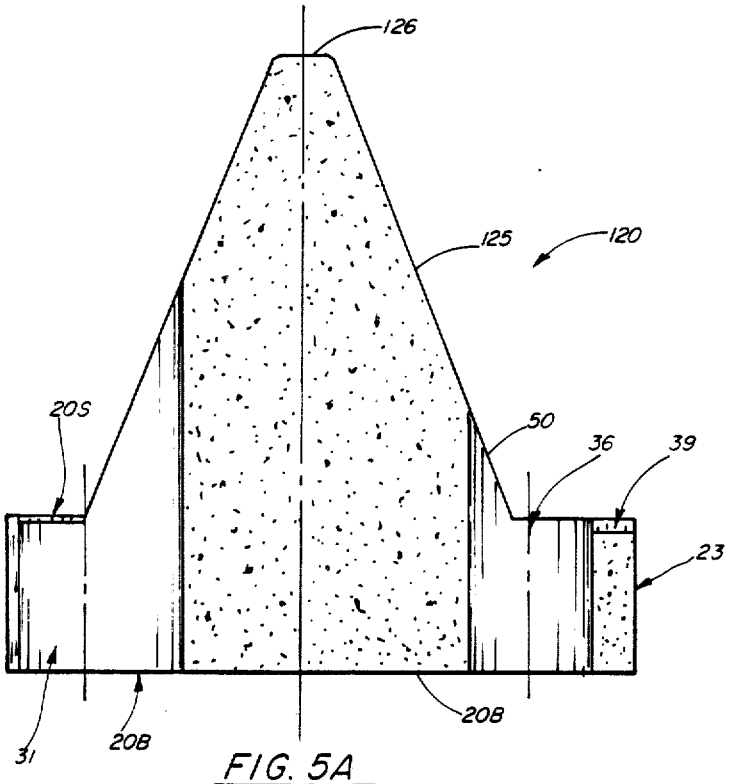
FIG. 5A is a sectional view taken along lines 5A—5A of FIG. 5.
Figure 6A:
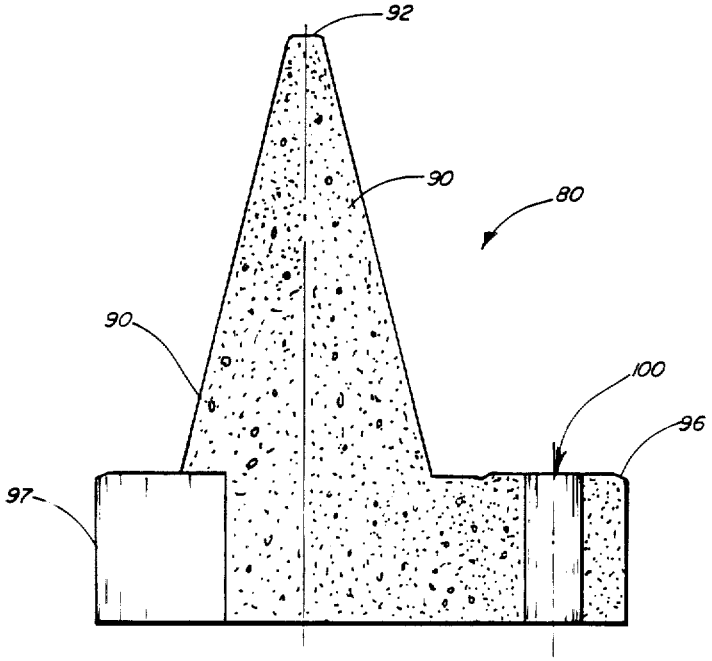
FIG. 6A is a sectional view taken along lines 6A—6A of FIG. 6.

In FIGS. 5A and 6A are seen sectional views illustrating more particularly the construction of each of lock block 120 and key block 80 with lock block 120 in FIGS. 5 and 5A providing a wave control cone 125 having a truncated top 126.

FIGS. 7 and 8 illustrate a connected assembly 10 of articulated erosion control system 10 with a plurality of lock blocks 20 being shown assembled with a plurality of key blocks 50. Note that an articulated erosion control system is formed which allows slight relative movement of the blocks 20, 50 with respect to one another allowing it to conform to irregularities in the terrain and allowing slight degrees of vertical and horizontal movement between each block. While three-way locking is shown here, two-way and four-way locking could also be used. For example, lock blocks with four sockets and key blocks with two locking tips could be used.

Figure 8A:
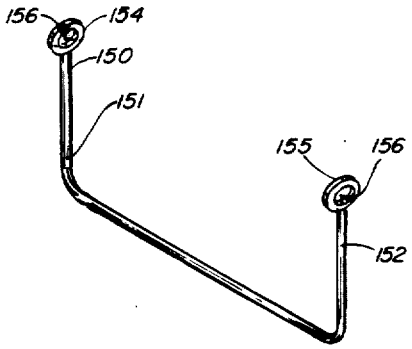
FIG. 8A is a perspective view of the hanger portion of the preferred embodiment of the apparatus of the present invention useful in the embodiment of FIG. 8.
Figure 8:
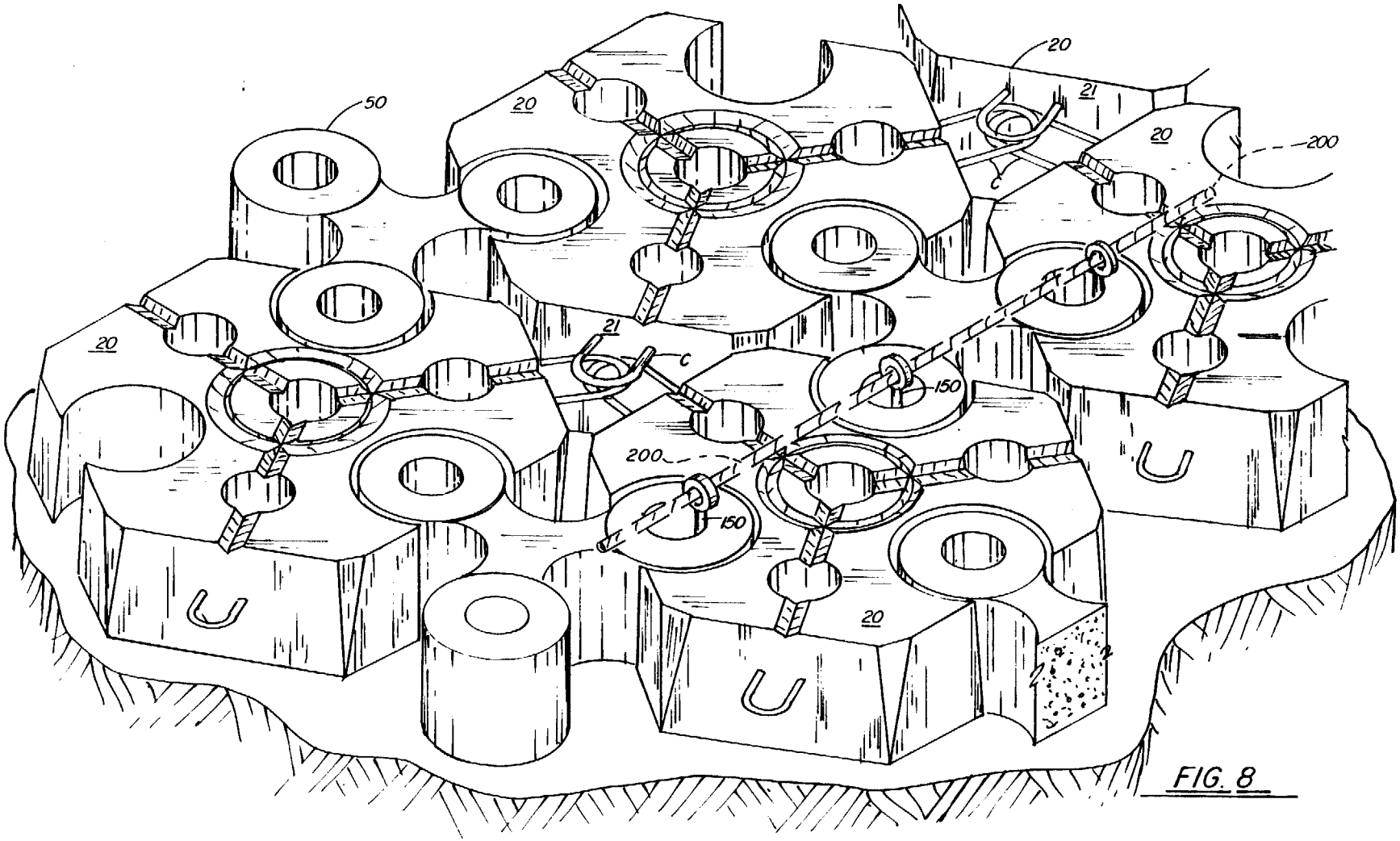
FIG. 8 is a perspective view of a plurality of key blocks and lock blocks interconnected to provide the articulated erosion control system of the present invention and illustrating the vertical support system portion thereof.

In FIGS. 8–8A there can be seen the use of hangers 150 which are substantially U-shaped providing parallel side rods 151, 152 each of which is provided at its upper portion with an eyelet 154, 155 with each eyelet providing an opening 156 through which a suitable hanger line 200 can be placed with a network of hanger lines being used to interlace the provided hangers 150 in such a fashion as to allow the entire mat to be supported as shown in FIG. 9, during lifting of mat assembly 10. Alternatively, mat 10 could be supported from below using a continuous flexible sheet or net which would support mat 10 in a vertical direction with the interlocking connection taught herein maintaining horizontal spacing. In FIGS. 7 and 10 an underlying supportive sheet (preferably perforated to allow for fluid flow therethrough) is schematically shown as 210.

FIG. 10 schematically illustrates a support cable 160 attaching to beam B at eyelet 162 with bottom eyelets 164, 165 also being provided with side support cables 166, 168 which would attach to hanger line 200 and thus support mat 10 during lifting and installation onto an area which needs erosion control.

Since blocks 20, 50 proivde themselves the interlocking necessary to maintain the integrity and connections of mat 10, erosion control in a particular area will be maintained even after sheet S or cable 200 with hangers 150 have corroded away as occurs. Thus, the utility of sheet S or hangers 150 and cable 200 could be primarily for installation, assembly, transportation and lifting, with the interlocking mat above taught serving by itself to control erosion and wave action.

Because many varying and different embodiments may be made within the scope of the inventive concept herein taught, and because many modifications may be made in the embodiments herein detailed in accordance with the descriptive requirement of the law, it is to be understood that the details herein are to be interpreted as illustrative and not in a limiting sense. The invention is to be limited only by the scope of the claims appended hereto.

What is claimed as invention is:

[1. An erosion control mat comprising:

a. a plurality of erosion controlling members connected to each other so that the members form an interconnected network conforming to the underlying terrain for preventing erosion b. adjacent member including complementary angularly articulating connection means for connecting the members and allowing articulation of the lower surfaces thereof relative to one another to conform to the underlying terrain; and c. the articulating connection means including interconnecting sockets and arms on adjacent blocks, the arms loosely engaging the sockets so that the adjacent members are capable of articulating movement relative to each other and at the same time maintaining their relative spacial arrangement.]

[2. The erosion control mat of claim 1, wherein at least one of the blocks is a hexagonal block comprising in part three sockets spaced about the exterior edge protions thereof.]

[3. The erosion control mat of claim 2, wherein one of the blocks has three locking arms.]

[4. The erosion control mat of claim 3, wherein the locking arms on the block are equiangularly spaced.]

[5. The erosion control mat of claim 1, wherein each of the sockets has, at least in part, a recess portion adjacent to the periphery of the block, the socket being narrowed at its intersection with the edge of the block, and each of the locking arms having, at least in part, a locking head portion at its periphery and a neck, narrower than the head, connecting the central hub with the head portion, the head portion cooperating to occupy the recess with the narrowed neck occup ing a position at the narrowed portion of the socket.]

[6. The articulated erosion control mat of claim 1, wherein the blocks comprise an integral block body defined by upper and lower surfaces and a peripheral terminal wall, and wherein each of the sockets are open-ended and communicate with said upper and lower surfaces and with the terminal wall, and the blocks with locking arms comprise a central hub with locking arms projecting radially therefrom.]

[7. The articulated erosion control mat of claim 6, further having relieved means on the surface of the blocks for collecting soil on the surface of the first blocks during use thereof.]

[8. The articulated erosion control mat of claim 6, further having at least one vertical channel formed through each block.]

[9. An articulated erosion control block mat comprising:

a. a first lock block having an upper surface and a lower surface spaced therefrom with a peripheral terminal wall defining the edge portion thereof;

b. a plurality of locking sockets spaced peripherally about said lock block with each of said sockets being open and communicating respectively to said upper surface, the lower suface and the peripheral terminal wall, the portion of the wall at the edge of the socket defining a narrowed portion of the socket; and c. at least one key block having an upper suface and a lower surface spaced therefrom and further comprising a central hub with a plurality of locking arms extending radially from said hub with each of said arms providing at its terminal end portion an enlarged head having a thickened portion which is thicker than the narrowed portion of the sockets, the locking head and the socket being similarly sized and the locking head being slightly smaller allowing the placement of the head into the socket and vertical movement therebetween, but disallowing substantial horizontal movement once the head is placed within the socket, and wherein the axis of the sockets and the heads are skewed with respect to the surfaces of the first block, forming means to connect the first block and the second block by a helical motion, thereby limiting further relative vertical movement between the first block and the second block.]

[10. The erosion control mat of claim 9, wherein the blocks have projections extending upwardly from the upper surfaces thereof to absorb wave energy.]

[11. The erosion control mat of claim 9, wherein the blocks are formed of cast concrete and contain wire reinforcing, the wire reinforcing extending outwardly beyond the walls of the blocks and forming loop means for joining adjacent blocks.]

[12. The erosion control mat of claim 9, wherein the mat is provided with wire loops supporting the blocks therein and wherein the loops have eyelets through which may be threaded supporting cables for lifting and installing the mats.]

[13. The erosion control mat of claim 9, wherein the blocks are mounted on a water permeable sheet.]

14. Th articulated erosion control system of claim [6,] *18* wherein the block lower surface and block terminal wall are beveled with respect to one another.

[15. The articulated erosion control mat of claim 6, wherein the block peripheral wall and lower surface are beveled with respect to one another.]

[16. The articulated erosion control mat of claim 1, wherein each of said block means comprises in part a block having a lower surface and a peripheral side wall which are beveled with respect to one another allowing movement of the terminal wall upper portions with respect to one another in a flexible articulating fashion.]

[17. An erosion control mat comprising:

a. first erosion controlling block means for conforming to an underlying terrain to be stabilized, said block means comprising at least a block member having a plurality of open-ended sockets spaced about the periphery thereof;

b. second erosion controlling means for conforming to an underlying terrain to be stabilized and connectable to the first block means, the second block means comprising a plurality of locking arms spaced about and integrally formed with a central hub; and c. angularly articulating connection menas including at least one of the sockets and a corresponding one of the locking arms for forming a connection between the first block means and the second block means, said connection means maintaining horizontal spacing of the blocks while allowing articulation of the block lower surfaces with respect to one another to conform to underlying terrain.]

*18. An erosion control mat comprising:*

*a. a plurality of lock blocks adapted to be connected to each other so that said blocks form an interconnected network conforming to the underlying terrain for preventing erosion, each of said blocks having at least three edges and three sockets formed in the respective edges, the sockets being arranged so that an equilateral triangle is formed by passing a line through the center of each socket and parallel to the adjacent edge;*

*b. a plurality of key blocks for connecting said lock blocks to form said interconnected network, said key blocks having connecting heads adapted to engage the sockets on adjacent lock blocks, said lock blocks having a relative spacial arrangement for said interconnected network such that the apexes of said equilateral triangles of adjacent lock blocks converge; and*

*c. said key block connecting heads being shaped and dimensioned to connect said lock blocks and cooperating so that the lower surfaces of said key blocks are capable of articulating movement relative to said lock blocks to conform to the underlying terrain and at the same time maintaining said relative spacial arrangement.*

*19. An erosion control mat according to claim 18, wherein each of said lock blocks is a hexagonal block comprising in part three sockets spaced about the exterior edge portions thereof.*

*20. An erosion control mat according to claim 19, wherein each of said key blocks has three connecting heads.*

*21. An erosion control mat according to claim 20, wherein said connecting heads of said key block are equiangularly spaced.*

*22. An erosion control mat according to claim 18, wherein said blocks have channels for collecting soil.*

*23. An erosion control mat according to claim 18, wherein said blocks are mounted on a water permeable sheet.*

*24. An erosion control mat according to claim 22, further having at least one vertical channel formed through each block.*

*25. An erosion control mat according to claim 18, wherein the axis of said sockets and said connecting heads are skewed with respect to the surfaces of the respective blocks.*

*26. An erosion control mat according to claim 18, wherein the peripheral side walls of said sockets are beveled relative to the peripheral side walls of said interconnecting heads.*

*27. An erosion control mat according to claim 18, wherein said socket has a reduced diameter portion for engaging said head to prevent said connecting head from passing completely through said socket.*

*28. An erosion control mat according to claim 18, wherein said interconnecting head has a shorter height than said sockets.*

*29. An erosion control mat according to claim 18, wherein said interconnecting head has the shape of a truncated cone.*

*30. An erosion control mat according to claim 18, wherein said socket has the shape of an inverted truncated cone.*

*31. A system of soil erosion prevention blocks positioned upon a surface for controlling the erosion of soil therefrom, comprising:*

*a plurality of lock blocks, each lock block having a plurality of recesses;*

*each of said recesses on said lock block having a center with an equilateral triangle being formed by passing a line through the center of said recess and parallel to the adjacent face of said lock block;*

*a plurality of key blocks, each key block having a plurality of locking arms with heads;*

*each of said heads forming an equilateral triangle by intersecting each of said heads at its center with a line perpendicular to the radial center line of each locking arm;*

*said plurality of lock blocks and key blocks being assembled with interlocking connections of adjacent recesses and heads;*

*said connected blocks becoming a mat forming an array of said equilateral triangles having the apexes of the triangles converging.*

*32. An erosion control mat, comprising:*

*a lock block having at least three major sides that form at least a portion of the sides of an equilateral triangle and a recess at mid-point of each of said sides;*

*each of said recesses passing through said sides to form a throat therewith;*

*a key block having at least one arm with a locking head;*

*one of said recesses receiving said locking head and said throat of said one of said recesses receiving said arm; and*

*said heads and said throat interengaging to interconnect said lock block and key block whereby the apexes of said triangles of adjacent lock blocks converge.*

*33. A matrix system of soil erosion prevention blocks conforming to the underlying terrain for controlling the erosion of soil therefrom, comprising:*

*a plurality of blocks each having three major sides forming at least a portion of an equilateral triangle having three equidistant sides;*

*adjacent sides of said triangular modules of adjoining blocks abutting to form a matrix of adjacent equilateral triangular modules wherein the apex of said triangular modules converge; and*

*connectors for interlocking said adjoining blocks.*

*34. The matrix system of claim 33, wherein the center of said connector is on a line formed by said adjacent abutting sides.*

*35. An articulated erosion control block mat comprising:*

*(a) a first lock block having an upper surface and a lower surface spaced therefrom with a peripheral terminal wall defining the edge portion thereof;*

*(b) a plurality of locking sockets spaced peripherally about said lock block with each of said sockets being opened and communicating respectively to said upper*

*surface, the lower surface and the peripheral terminal wall, the portion of the wall at the edge of the socket defining a narrowed portion of the socket; and*

*(c) at least one key block having an upper surface and a lower surface spaced therefrom and further comprising a central hub with a plurality of locking arms extending radially from said hub with each of said arms providing at its terminal end portion an enlarged head having a thickened portion which is thicker than the narrowed portion of the sockets, the locking head and the socket being similarly sized and the locking head slightly smaller allowing the placement of the head into the socket in vertical movement therebetween, but disallowing substantial horizontal movement once the head is placed within the socket, and wherein the axis of the sockets and the head are skewed with respect to the surfaces of the first block, forming means to connect the first block and the second block by a helical motion, thereby limiting further relative vertical movement between the first block and the second block wherein the blocks have projections extending upwardly from the upper surfaces thereof to absorb wave energy.*

*36. An articulated erosion control block mat comprising:*

*(a) a first lock block having an upper surface and a lower surface spaced therefrom with a peripheral terminal wall defining the edge portion thereof;*

*(b) a plurality of locking sockets spaced peripherally about said lock block with each of said sockets being opened and communicating respectively to said upper surface, the lower surface and the peripheral terminal wall, the portion of the wall of the edge of the socket defining a narrowed portion of the socket; and*

*(c) at least one key block having an upper surface and a lower surface spaced therefrom and further comprising a central hub with a plurality of locking arms extending radially from said hub with each of said arms providing at its terminal end portion an enlarged head having a thickened portion which is thicker than the narrowed portion of the sockets, the locking head and the socket being similarly sized and the locking head slightly smaller allowing the placement of the head into the socket in vertical movement therebetween, but disallowing substantial horizontal movement once the head is placed within the socket, and wherein the blocks are formed of cast concrete and contain wire reinforcing, the wire reinforcing extending outwardly beyond the walls of the blocks and forming loop means for joining adjacent blocks.*

*37. An articulated erosion control block mat comprising:*

*(a) a first lock block having an upper surface and a lower surface spaced therefrom with a peripheral terminal wall defining the edge portion thereof;*

*(b) a plurality of locking sockets spaced peripherally about said lock block with each of said socket being opened and communicating respectively to said upper surface, the lower surface and the peripheral terminal wall, the portion of the wall at the edge of the socket defining a narrowed portion of the socket; and*

*(c) at least one key block having an upper surface and a lower surface spaced therefrom and further comprising a central hub with a plurality of locking arms extending radially from said hub with each of said arms providing at its terminal end portion an enlarged head having a thickened portion which is thicker than the narrowed portion of the sockets, the locking head and the socket being similarly sized and the locking head slightly smaller allowing the placement of the head into the socket in vertical movement therebetween, but disallowing substantial horizontal movement once the head is placed within the socket, and wherein the mat is provided with wire loops supporting the blocks therein and wherein the loops have eyelets through which may be threaded supporting cables for lifting and installing the mats.*

*38. An articulated erosion control block mat comprising:*

*(a) a first lock block having an upper surface and a lower surface spaced therefrom with a peripheral terminal wall defining the edge portion thereof;*

*(b) a plurality of locking sockets spaced peripherally about said lock block with each of said sockets being opened and communicating respectively to said upper surface, the lower surface and the peripheral terminal wall, the portion of the wall at the edge of the socket defining a narrowed portion of the socket; and*

*(c) at least one key block having an upper surface and a lower surface spaced therefrom and further comprising a central hub with a plurality of locking arms extending radially from said hub with each of said arms providing at its terminal end portion an enlarged head having a thickened portion which is thicker than the narrowed portion of the sockets, the locking head and the socket being similarly sized and the locking head slightly smaller allowing the placement of the head into the socket in vertical movement therebetween, but disallowing substantial horizontal movement once the head is placed within the socket, and wherein the blocks are mounted on a water permeable sheet.*

* * * * *